United States Patent
Zimmermann et al.

(10) Patent No.: US 11,861,011 B2
(45) Date of Patent: Jan. 2, 2024

(54) SECURE BOOT PROCESS (71) Applicant: ZPE Systems, Inc., Fremont, CA (US)

(72) Inventors: Arnaldo Zimmermann, Dublin, CA (US); Livio Ceci, Fremont, CA (US)

(73) Assignee: ZPE Systems, Inc., Fremont, CA (US)

( * ) Notice: Subject to any disclaimer, the term of this patent is extended or adjusted under 35 U.S.C. 154(b) by 0 days.

(21) Appl. No.: 16/886,703

(22) Filed: May 28, 2020

(65) Prior Publication Data

US 2020/0410104 A1    Dec. 31, 2020

Related U.S. Application Data

(60) Provisional application No. 62/865,976, filed on Jun. 25, 2019.

(51) Int. Cl.
| | |
|---|---|
| *G06F 15/177* | (2006.01) |
| *G06F 9/44* | (2018.01) |
| *G06F 21/57* | (2013.01) |
| *G06F 21/31* | (2013.01) |
| *G06F 9/4401* | (2018.01) |

(52) U.S. Cl.
CPC .......... *G06F 21/575* (2013.01); *G06F 9/4406* (2013.01); *G06F 9/4416* (2013.01); *G06F 21/31* (2013.01)

(58) Field of Classification Search
None
See application file for complete search history.

(56) References Cited

U.S. PATENT DOCUMENTS

| | | | | |
|---|---|---|---|---|
| 8,555,049 B2* | 10/2013 | Takayama | ............. | G06F 21/575 |
| | | | | 713/2 |
| 10,671,731 B2* | 6/2020 | Furuya | .................... | G06F 21/32 |
| 2008/0139116 A1* | 6/2008 | Balgard | ................. | G08C 17/02 |
| | | | | 700/83 |
| 2009/0100516 A1* | 4/2009 | Ray | ........................ | G06F 15/177 |
| | | | | 726/19 |
| 2011/0016283 A1* | 1/2011 | Davis | ..................... | G06F 3/0605 |
| | | | | 711/170 |
| 2013/0054994 A1* | 2/2013 | Stancil | .................. | G06F 1/3203 |
| | | | | 713/323 |
| 2014/0208090 A1* | 7/2014 | Anson | .................... | G06F 9/4401 |
| | | | | 713/2 |
| 2014/0281577 A1* | 9/2014 | Nicholes | ................. | G06F 21/85 |
| | | | | 713/189 |
| 2015/0149757 A1* | 5/2015 | Brown | ..................... | G06F 21/74 |
| | | | | 713/2 |
| 2018/0246552 A1* | 8/2018 | Thompson | .......... | G06F 11/3093 |
| 2020/0226262 A1* | 7/2020 | Yeh | ....................... | G06F 11/3051 |
| 2020/0302062 A1* | 9/2020 | Rizos | .................. | G07F 17/3225 |

* cited by examiner

*Primary Examiner* — Fahmida Rahman
(74) *Attorney, Agent, or Firm* — HORIZON IP PTE LTD.

(57) ABSTRACT

Described herein is a framework for secure boot process. In accordance with one aspect, in response to detecting a power signal, a first boot software component according to a boot sequence is loaded. In response to determining no event has occurred, at least one additional boot software component is successively loaded according to the boot sequence in an uninterrupted boot process. In response to determining the end of the boot sequence is reached, the operating system may then be loaded.

20 Claims, 5 Drawing Sheets

SECURE BOOT PROCESS

CROSS-REFERENCE TO RELATED APPLICATION

The present application claims the benefit of U.S. provisional application No. 62/865,976, filed on Jun. 25, 2019, the entire contents of which are herein incorporated by reference.

BACKGROUND

BIOS (Basic Input/Output System) is a main part of a boot process of a computer system. The typical main functions of a BIOS is to boot the computer system, validate a computer system's configuration and provide an interface between the hardware of the computer system and its software.

Without security measures, the boot process does not require any authentication to complete. Existing secure boot approaches require user's interaction to provide a password whenever the computer system is powered up or reboots to enter setup to change settings. Typically, when the computer system is turned on, a message is displayed that allows the user to press a specific keyboard input key to enter a BIOS setup. When this key is pressed within a set time period, the BIOS code will display a setup screen that can be used to change these settings.

BRIEF DESCRIPTION OF DRAWINGS

Some implementations are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps, however, these separately delineated steps should not be construed as necessarily order dependent in their performance.

A framework for securing a boot process is described herein. The present framework allows the securing of access to the computer system's boot software components. "Boot software component" as used herein generally refers to low-level software that starts when the computer system is booted, including but is not limited to, a BIOS, Preboot eXecution Environment (PXE), bootloader, or a combination thereof. The framework may apply security measures to the boot process to the extent that these measures do not interrupt the boot process, unless there is an event or action triggered by a user or any external system. Furthermore, the framework may enforce a secure booting sequence that is defined (or configured) directly from the Operating System (OS).

The complete boot process may be secured by requiring authentication in case of any action or event triggered by the user or any remote system that is intended to interrupt or deviate from the defined boot sequence. More particularly, the present framework enforces a single application, which secures all the boot software components of a boot process of a computer system. The framework further extends the ability to configure the boot software (e.g., BIOS, UEFI, bootloader) to enable other functionalities of a booting computer system.

Existing systems require individual configuration of security options of each boot software component. All components of the boot process cannot be configured remotely, since network access is not fully active until the OS takes control. In usual computer deployments, the OS does not have access to most of the BIOS and bootloader settings. The present framework provides a centralized application that configures all boot components and prevents skipping of security enforcement of any of them (i.e. avoids breaches). It also enables consistent setup of all individual boot software components. The ability to configure all boot software components directly from the OS allows enabling of secure boot remotely, upon proper authentication, via standard network access. These and other exemplary features will be described in more details herein.

Figure 1:
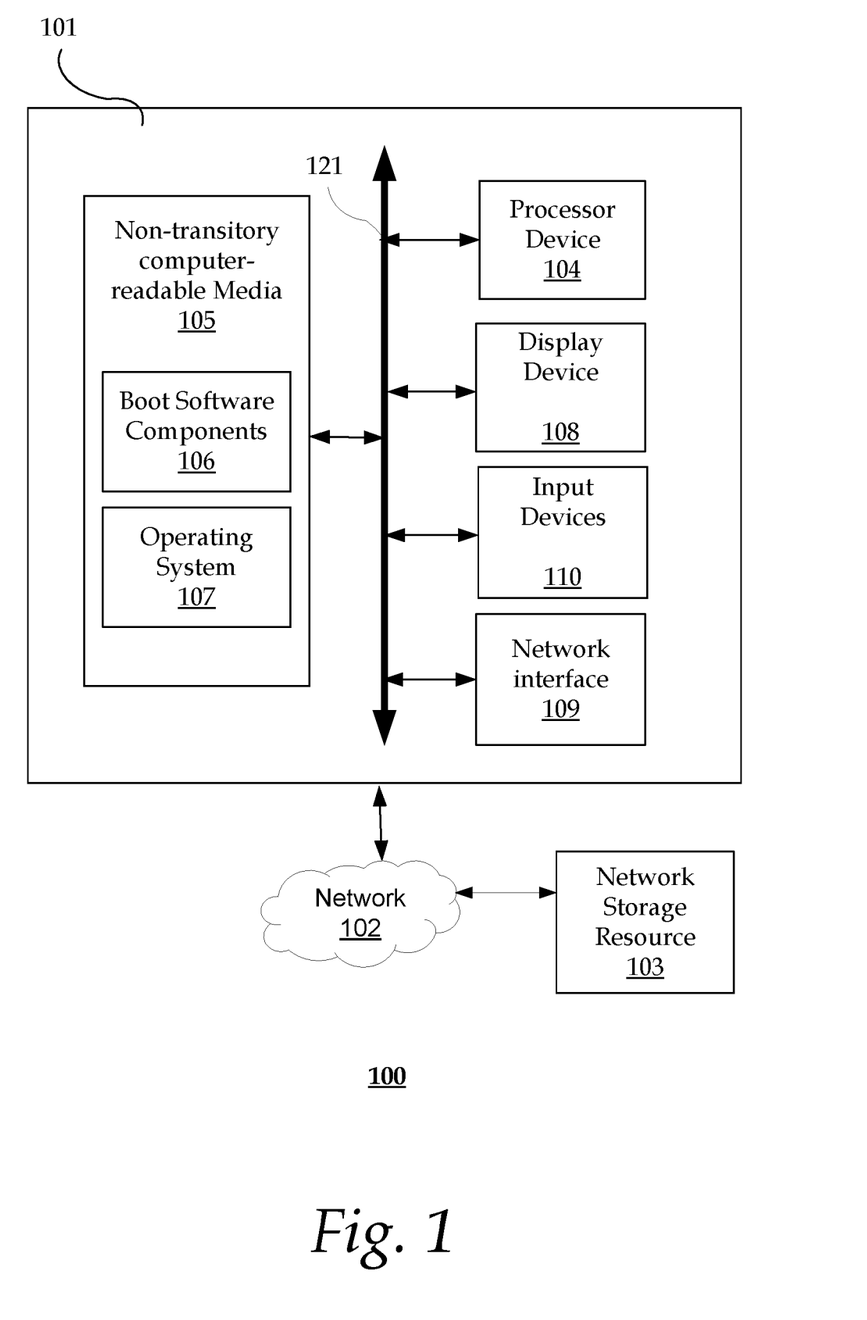
FIG. 1 shows a block diagram illustrating an exemplary system.

FIG. 1 is a block diagram illustrating an exemplary system 100. The system 100 includes a computer system 101 for implementing the framework as described herein. Computer system 101 may be a personal computer (e.g., desktop or laptop), a tablet computer, a mobile device (e.g., personal digital assistant (PDA) or smart phone), server (e.g., blade server or rack server), a consumer electronic device, a network storage device, or another suitable device. In some implementations, computer system 101 operates as a stand-alone device. In other implementations, computer system 101 may be connected using a network interface 109 via a network 102 to other machines, such as network storage resource 103. In a networked deployment, computer system 101 may operate in the capacity of a server, a cloud computing platform, a client user machine in server-client user network environment, or as a peer machine in a peer-to-peer (or distributed) network environment.

Network interface 109 may enable computer system 101 to communicate over network 102 using a suitable transmission protocol and/or standard. Network 102 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 102 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof.

In some implementations, computer system 101 comprises one or more processors or central processing units (CPUs) 104 coupled to one or more non-transitory computer-readable media 105 (e.g., computer storage or memory), a display device 108 (e.g., monitor) and various input devices 110 (e.g., mouse or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

Non-transitory computer-readable media 105 may be volatile, non-volatile or a combination thereof. Non-transitory computer-readable media 105 may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. Non-transitory computer-readable media 105 may include an instrumentality or aggregation of instrumentalities that may retain data or one or more instructions or both for a period of time. Non-transitory computer-readable media 105 may include, but is not limited to, storage media such as a direct access storage device (for example, a hard disk drive or a floppy disk), a sequential access storage device (for example, a tape disk drive), a compact disk, a CD-ROM, a DVD, a random access memory (RAM), a read-only memory (ROM), an electrically erasable programmable read-only memory (EEPROM), and/or a flash memory (SSD), as well as communications media such as wires, optical fibers, microwaves, radio waves, other electromagnetic and/or optical carriers and/or any combination thereof.

The present technology may be implemented in various forms of hardware, software, firmware, special purpose processors, or a combination thereof, either as part of the microinstruction code or as part of an application program or software product, or a combination thereof, which is executed via the operating system. In some implementations, the techniques described herein are implemented as computer-readable program code tangibly embodied in non-transitory computer-readable media 105. In particular, the present techniques may be implemented by one or more boot software components 106 and Operating System (OS) 107.

The computer-readable program code is executed by CPU 104 to process data stored in, for example, network storage resource 103. As such, the computer system 101 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
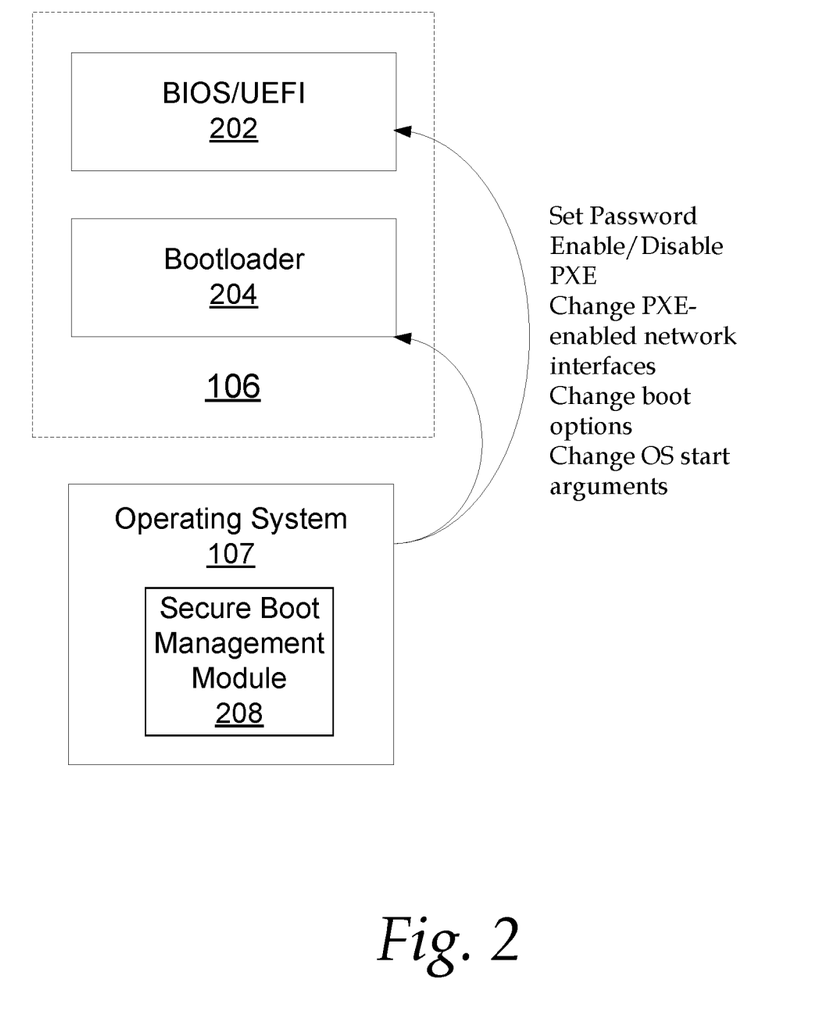
FIG. 2 illustrates an exemplary central configuration framework.

FIG. 2 illustrates an exemplary central configuration framework. More particularly, the OS 107 includes a secure boot management module 208 that enables central configuration of boot parameters in the boot software components 106. As shown, the boot software components 106 may include BIOS/UEFI 202 and bootloader 204. BIOS 202 represents, for example, pre-boot instructions executable by processor device 104 for, for example, preparing or initializing computer system 101 to boot by performing a power-on self-test (POST) or activating various hardware components in preparation of launching the operating system (OS) 107 for execution. In some implementations, the BIOS complies with a Unified Extensible Firmware Interface (UEFI) specification promulgated by the UEFI Forum (UEFI.org). BIOS/UEFI 202 may be secured or password protected to prevent access to privileged data and unauthorized changes to boot settings (e.g., disk units, partitions, PXE configuration).

Bootloader 204 manages and executes the boot sequence of the computer system 101. Bootloader 204 is typically started after the BIOS 202 has finished performing the initial power and hardware device checks and tests. Bootloader 204 fetches the OS kernel from the hard disk or any specified boot device within the boot sequence into the main memory. Bootloader 204 may be secured (e.g., password protected) to prevent access to privileged data and/or unauthorized changes to boot settings (e.g., operating system location or starting parameters).

OS 107 represents instructions executable by processor device 104 to operate computer system 101 after booting of BIOS 202. OS 107 is system software that manages computer hardware, software resources, and provides common services for computer programs. In some implementations, OS 107 includes a secure boot management module 208 that may be used to configure a secure boot sequence. It should be appreciated that other software components may also be implemented in the OS 107.

Secure boot management module 208 may be used to enable security measures (e.g., password protection) for boot software components (e.g., BIOS/UEFI 202 and bootloader 204) of a boot process to be effective only if the normal boot process is interrupted or deviated by, for example, user input or other event by, for example, a remote system. Unlike existing implementations that provide security by requiring user interaction in every boot, secure boot management module 208 implements a boot sequence suitable for computer systems (e.g., servers) that need to run without user interference, while providing password protection for securing the boot software components.

The secure boot management module 208 also extends the ability to secure the boot process by enabling central configuration of the boot software components 106 directly from the OS 107. For example, the BIOS/UEFI 202 and bootloader 204 may be configured by the secure boot management module 208 to enable other functionalities of the booting computer system 101. Such functionalities include, but are not limited to, setting password, enabling or disabling the Preboot eXecution Environment (PXE), enabling, disabling and/or changing PXE-capable network interfaces, changing boot options (e.g., sequence of devices allowed to boot the computer system 101), changing start arguments of the OS 107, or a combination thereof.

This approach of implementing secure boot management in the OS 107 (instead of the BIOS or bootloader) adds consistency to the entire system setup, thereby increasing and enhancing the security required. Traditional solutions, such as Intelligent Platform Management Interface (IPMI), operate independently of the OS and require another device or component (e.g. BMC—Baseboard Management Controller) to be present in the computer hardware in order to interface between OS and BIOS/UEFI.

Figure 3:
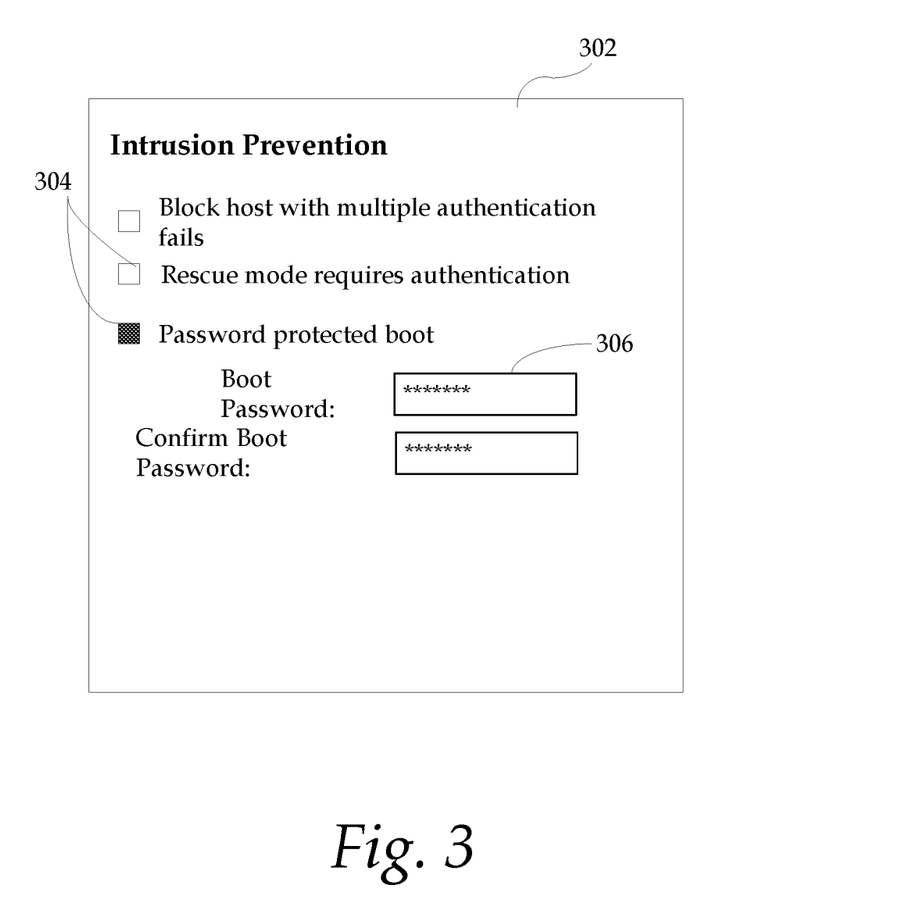
FIG. 3 shows an exemplary user interface screen for configuring intrusion prevention security measures.

FIG. 3 shows an exemplary user interface screen 302 for configuring intrusion prevention security measures. User interface screen 302 may be generated by the secure boot management module 208 implemented in the OS 107. As shown, various security measures for boot software components 106 may be enabled by the user selecting the desired user interface elements (e.g., check boxes) 304. For example, the user may enable authentication for rescue mode. Additionally, the user may enable password protected boot and enter the desired password 306. Such password may be used to protect boot software components 106 (e.g., BIOS and bootloader). Alternatively, separate passwords (not shown) may be provided for different boot software components 106.

Figure 4:
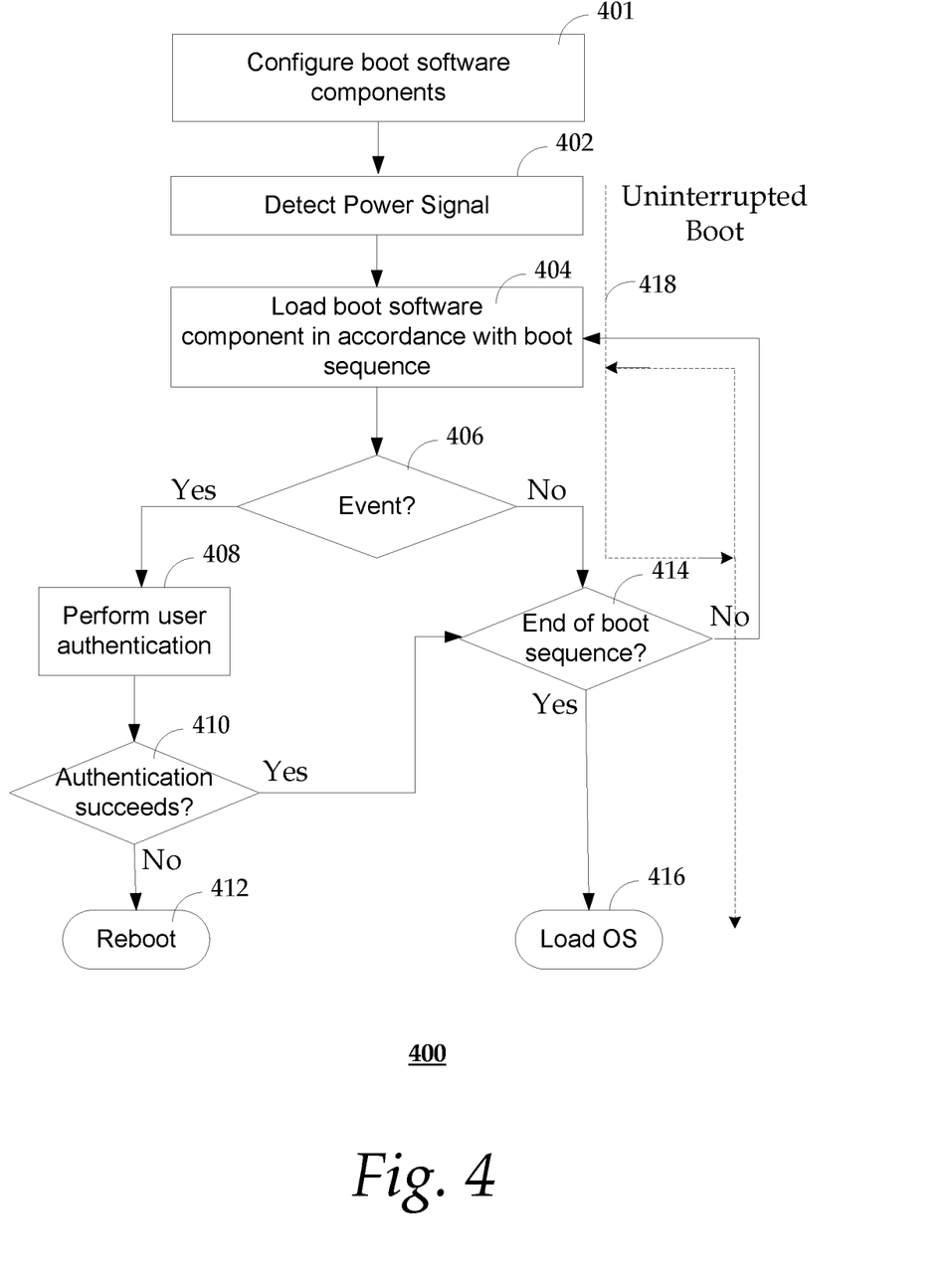
FIG. 4 shows an exemplary secure boot method.

FIG. 4 shows an exemplary secure boot method 400. It should be understood that the steps of the method 400 may be performed in the order shown or a different order. Additional, different, or fewer steps may also be provided. Further, the method 400 may be implemented with the system 100 of FIGS. 1 and 2, a different system, or a combination thereof.

At 401, boot software components in a boot sequence are configured via the secure boot management module 208 implemented in the operating system 107. In some implementations, all boot software components may be directly configured using the secure boot management module 208. Each boot software component may be protected by a user authentication mechanism or otherwise prevented from being altered, edited or changed without one or more credentials or permissions. The user authentication mechanism (e.g., password protection) of each boot software component may be configured (e.g., enabled or disabled, setting password) via the secure boot management module 208. Other settings of each boot software component that may be configured include, but are not limited to, enabling or disabling the Preboot eXecution Environment (PXE), enabling, disabling and/or changing PXE-capable network interfaces, changing boot options (e.g., sequence of devices allowed to boot the computer system 101), changing start arguments of the OS 107, or a combination thereof.

At 402, a power signal is detected. "Power signal" generally refers to a signal that corresponds to a user action or external event that is intended to activate, reboot or restart the computer system 101. The power signal may be initiated by the user or by the computer system 101 in response to, for example, a failed authentication attempt.

At 404, the first boot software component in the boot sequence is loaded. The boot sequence is the order in which the computer system 101 searches for non-volatile data storage devices containing boot software components to load the OS 107 or runtime environment. The boot sequence may be defined via secure boot management module 208 in OS 107. The boot sequence may be defined (or configured) directly from the OS 107.

At 406, it is determined if an event has occurred. Such "event" generally refers to a predefined user interaction (e.g., predefined keystrokes) or action initiated by, for example, a remote computer system or other host in response to, for example, hardware failure, thermal alarm or advanced configuration and power interface (ACPI) trigger.

If no event occurred, the method 400 proceeds to 414. Otherwise, in response to an occurrence of the event, the boot software component performs user authentication at 408. User authentication allows the computer system 101 to verify the identity of the user (or machine) who is attempting to access the boot software component. User authentication measures include, but are not limited to, entering a password, inserting a smart card and entering the associated personal identification number (PIN), providing a fingerprint, voice pattern sample, or retinal scan, or using some other mechanism to prove the user's authenticity. At 410, the boot software component determines if the user authentication succeeds (or passes). If the user authentication is successful, the method 400 continues to 414. If the user authentication fails, the computer system 101 may be rebooted at 412. The method 400 may then restart at 402. If the number of failed authentication attempts exceeds a predetermined threshold, the user (or host) may be blocked.

At 414, it is determined if the end of the boot sequence is reached. The end of the boot sequence is reached when there are no more boot software components to be loaded. If the end of the boot sequence is not reached, the method 400 returns to 404 to load the next boot software component. If yes, the method 400 proceeds to 416. At 416, the OS 107 is loaded. Accordingly, without the occurrence of any event, the boot method 400 follows the uninterrupted boot process depicted by the tracing line 418 by successively loading boot software components in accordance with the boot sequence. Any event that attempts to deviate from the uninterrupted boot sequence requires user authentication.

Figure 5:
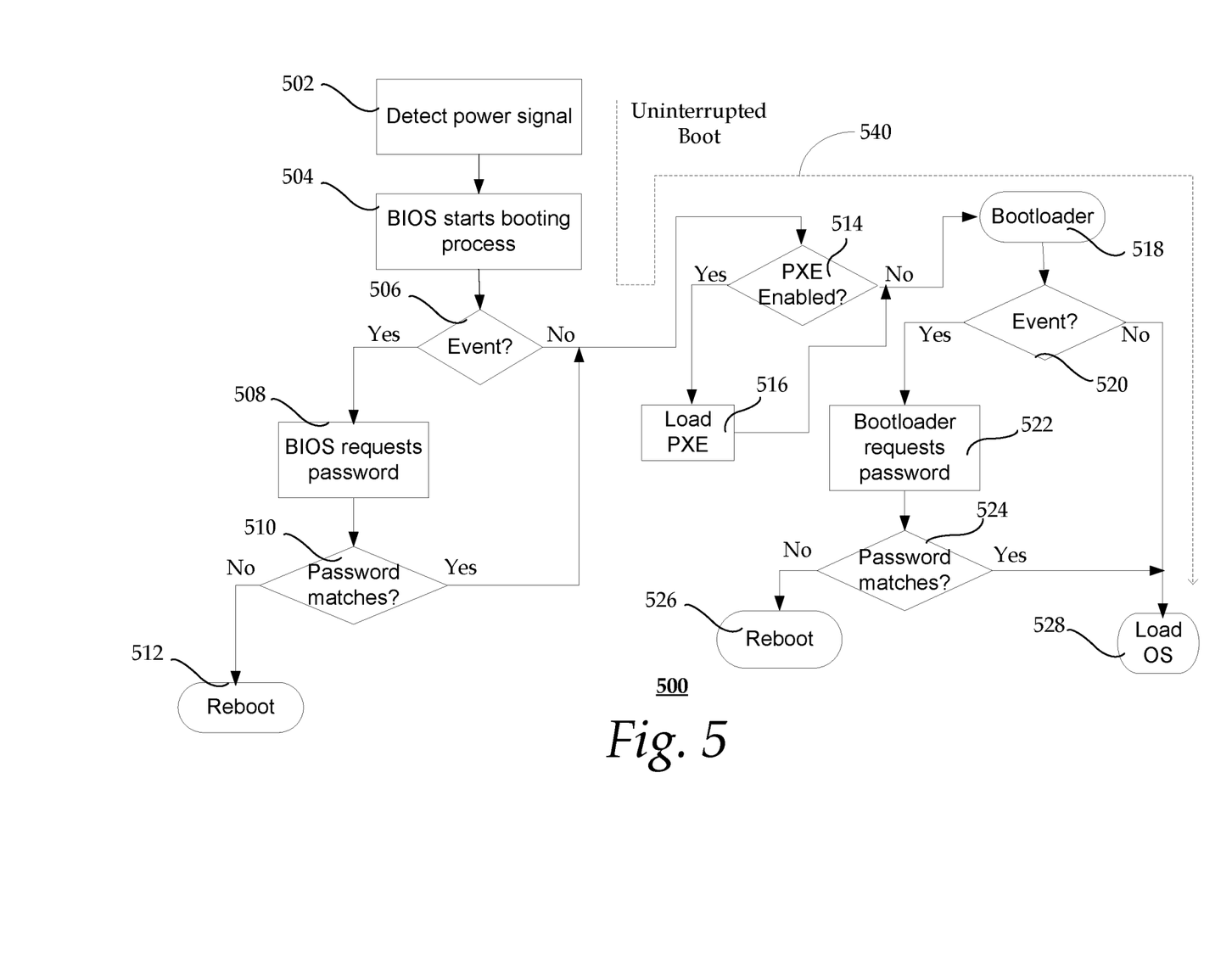
FIG. 5 shows an exemplary implementation of a secure boot process.

FIG. 5 shows an exemplary implementation of a secure boot process 500. It should be understood that the steps of the process 500 may be performed in the order shown or a different order. Additional, different, or fewer steps may also be provided. Further, the process 500 may be implemented with the system 100 of FIGS. 1 and 2, a different system, or a combination thereof.

At 502, a power signal or reboot is detected. At 504, BIOS 202 is loaded and starts the booting process. BIOS 202 represents, for example, pre-boot instructions executable by processor device 104 for preparing or initializing computer system 101 to boot by, for example, activating various hardware components in preparation of launching OS 107 for execution. In some implementations, BIOS 202 complies with a Unified Extensible Firmware Interface (UEFI) specification promulgated by the UEFI Forum (UEFI.org).

At 506, it is determined if an event occurred. If no event occurred, the process 500 proceeds to 514. Otherwise, in response to an occurrence of the event, the BIOS 202 requests a password at 508. As discussed previously, the password may be configured via the secure boot management module 208. At 510, BIOS 202 determines if the received password matches the actual password. If the password matches, the process 500 continues to 514. If the password does not match, the computer system 101 may be rebooted at 512. The process 500 may then restart at 502. If the number of failed authentication attempts exceeds a predetermined threshold, the user or host may be blocked.

At 514, it is determined whether Preboot eXecution Environment (PXE) is enabled. PXE is a protocol that enables computers to boot through a network. PXE can be enabled or disabled via secure boot management module 208 in the OS 107. If PXE is disabled, process 500 proceeds to directly to 518. Otherwise, if PXE is enabled, the process 500 proceeds to 516 to load and execute the PXE. PXE allows a workstation to boot from a server on a network prior to booting the OS 107. PXE may be used to set up a common set of pre-boot protocol services within a client to ensure that network-based booting is accomplished through an industry standard protocol for communication with the server.

At 518, bootloader 204 is loaded. At 520, it is determined if an event occurred. If no event occurred, the process 500 proceeds to 528. Otherwise, in response to an occurrence of the event, the bootloader 204 requests a password at 522. As discussed previously, the password may be configured via the secure boot management module 208. At 524, bootloader 204 determines if the received password matches the actual password. If the password matches, the process 500 continues to 528. If the password does not match, the computer system 101 may be rebooted at 526. The process 500 may then restart at 502. If the number of authentication attempts exceeds a predetermined threshold, the user or host may be blocked.

At 528, OS 107 is loaded. Accordingly, without the occurrence of any event, the boot process 500 follows the uninterrupted boot sequence depicted by the tracing line 540. Any attempt to deviate from the uninterrupted boot sequence requires user authentication.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A secure boot process system, comprising:
one or more non-transitory machine-readable media for storing computer-readable program code; and
at least one processor in communication with the one or more non-transitory machine-readable media, the at least one processor being operative with the computer-readable program code to perform steps including
 (i) configuring, via a secure boot management module implemented in an operating system, at least one user authentication mechanism that protects one or more boot software components during a boot sequence of the secure boot process system, including configuring a password of the at least one user authentication mechanism,
 (ii) determining whether an event has occurred during the boot sequence of the secure boot process system, wherein the event comprises an action initiated by a remote computer system,
 (iii) in response to determining the event has not occurred, successively loading the one or more boot software components in the one or more non-transitory machine-readable media of the secure boot process system according to the boot sequence in an uninterrupted boot process,
 (iv) in response to determining the event has occurred, executing the user authentication mechanism including requesting an input from a user that verifies identity of the user prior to allowing access to the one or more boot software components in the secure boot process system, and
 (v) in response to determining end of the boot sequence is reached, loading the operating system in the one or more non-transitory machine-readable media of the secure boot process system.

2. The secure boot process system of claim 1 wherein the boot software components comprise a Basic Input/Output System (BIOS), a bootloader, a Preboot eXecution Environment (PXE), or a combination thereof.

3. The secure boot process system of claim 1 wherein the at least one processor is operative with the computer-readable program code to configure the at least one user authentication mechanism by enabling or disabling the at least one user authentication mechanism.

4. The secure boot process system of claim 1 wherein the input by the user comprises the password, a personal identification number (PIN), a fingerprint, a voice pattern, a retinal scan, or a combination thereof.

5. A secure boot method, comprising:
 (i) configuring, via a secure boot management module implemented in an operating system of a first computer system, at least one user authentication mechanism that protects one or more boot software components during a boot sequence of the first computer system, including configuring a password of the at least one user authentication mechanism;
 (ii) determining that an event has occurred during the boot sequence of the first computer system and responsive to the determining, executing the user authentication mechanism including requesting an input from a user that verifies identity of the user prior to allowing access to the one or more boot software components in the first computer system, wherein the event comprises an action initiated by a remote computer system;
 (iii) loading the operating system in a memory of the first computer system at end of the boot sequence.

6. The method of claim 5 wherein configuring, via the secure boot management module implemented in the operating system, the at least one user authentication mechanism comprises enabling or disabling blocking a host with multiple failed authentication attempts during the boot sequence.

7. The method of claim 5 wherein the action is initiated by the remote computer system in response to hardware failure, thermal alarm or advanced configuration and power interface (ACPI) trigger.

8. The method of claim 5 wherein configuring the at least one user authentication mechanism comprises enabling or disabling the at least one user authentication mechanism.

9. The method of claim 5 further comprises configuring, via the secure boot management module implemented in the operating system, the one or more boot software components by configuring a Preboot eXecution Environment (PXE) or a PXE-capable network interface.

10. The method of claim 5 further comprises configuring, via the secure boot management module implemented in the operating system, the one or more boot software components by changing boot options or start arguments of the operating system.

11. The method of claim 5 further comprises configuring, via the secure boot management module implemented in the operating system, the one or more boot software components by defining the boot sequence, wherein the boot sequence indicates an order in which devices containing boot software components are searched to load the operating system.

12. The method of claim 5 further comprises in response to detecting a power signal, loading a first boot software component of the boot sequence.

13. The method of claim 5 wherein the remote computer system is a host.

14. The method of claim 5 wherein the input by the user comprises the password, a personal identification number (PIN), a fingerprint, a voice pattern, a retinal scan, or a combination thereof.

15. The method of claim 5 further comprises in response to failure of the user authentication, restarting the boot sequence.

16. The method of claim 5 wherein the boot software components comprise a Basic Input/Output System (BIOS), a Preboot eXecution Environment (PXE), a bootloader, or a combination thereof.

17. One or more non-transitory machine-readable media embodying a program of instructions executable by machine to perform steps comprising:
    (i) configuring, via a secure boot management module implemented in an operating system, boot software components in a memory of a first computer system, including configuring a Preboot eXecution Environment (PXE) or a PXE-capable network interface;
    (ii) determining whether an event has occurred during a boot sequence of the first computer system, wherein the event comprises an action initiated by a remote computer system;
    (iii) in response to determining the event has occurred, performing user authentication by requesting an input by a user that verifies identity of the user during the boot sequence of the first computer system and prior to allowing access to the boot software components;
    (iv) in response to determining the event has not occurred, successively loading the boot software components according to the boot sequence of the first computer system; and
    (v) in response to determining end of the boot sequence is reached, loading the operating system in the memory of the first computer system.

18. The one or more non-transitory machine-readable media of claim 17 comprises further instructions executable by the machine to configure the Preboot eXecution Environment (PXE) or the PXE-capable network interface by enabling or disabling the Preboot eXecution Environment (PXE) or the PXE-capable network interface.

19. The one or more non-transitory machine-readable media of claim 18 comprises further instructions executable by the machine to further configure the boot software components by configuring at least one user authentication mechanism that protects the boot software components during the boot sequence.

20. The one or more non-transitory machine-readable media of claim 18 comprises further instructions executable by the machine to further configure the boot software components by defining the boot sequence, wherein the boot sequence indicates an order in which devices containing the boot software components are searched to load the operating system.

* * * * *